UNITED STATES PATENT OFFICE.

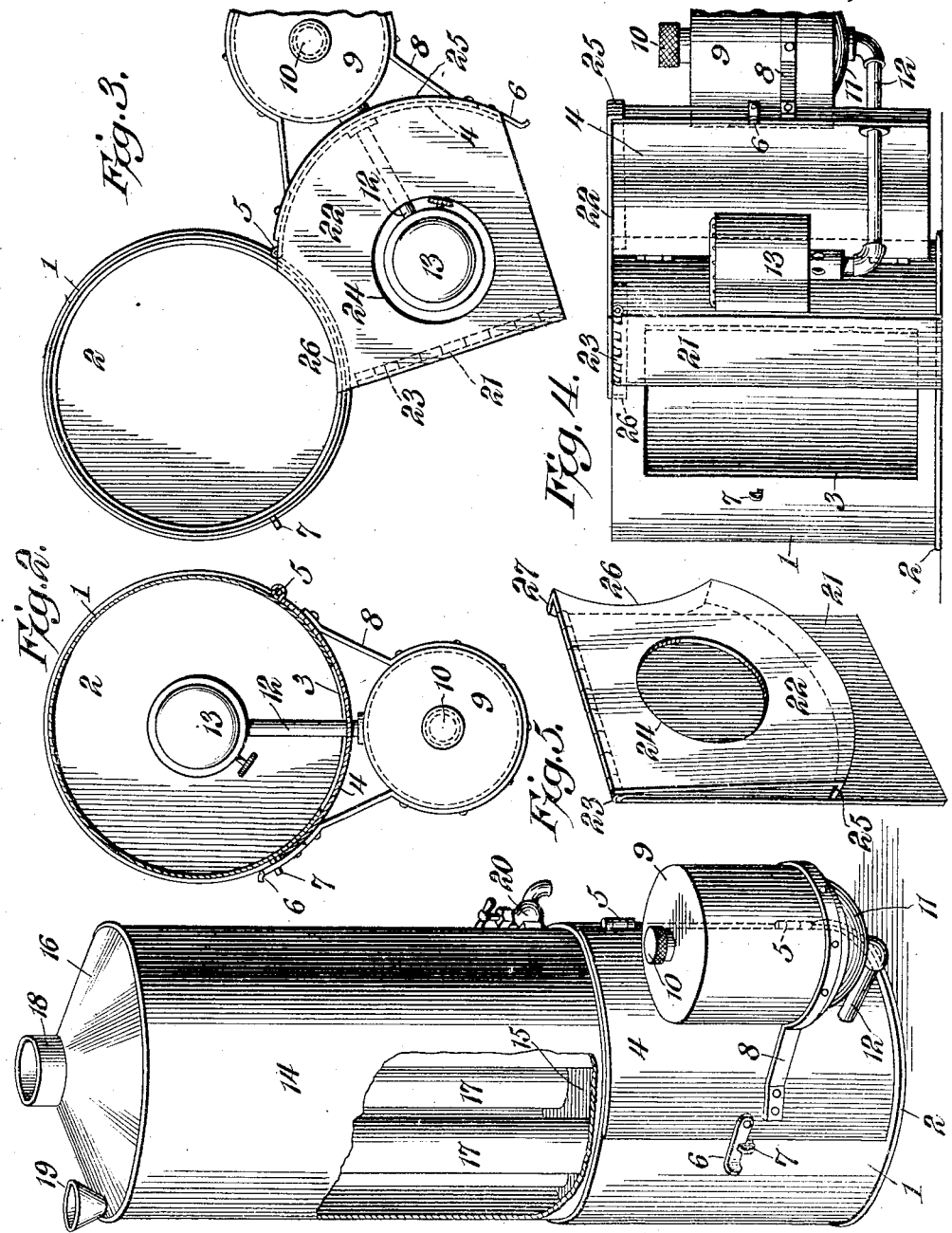

WILLIAM ANDREW BREWSTER, OF REDLANDS, CALIFORNIA.

HEATING DEVICE.

1,337,038.  Specification of Letters Patent.  Patented Apr. 13, 1920.

Application filed March 25, 1919. Serial No. 284,907.

*To all whom it may concern:*

Be it known that I, WILLIAM A. BREWSTER, a citizen of the Dominion of Canada, residing at Redlands, in the county of San Bernardino and State of California, have invented a new and useful Heating Device, of which the following is a specification.

This invention has reference to heating devices, and its object is to provide a simple form of device which may be used for heating water or other liquids and may be readily converted into a cooking utensil.

In accordance with the invention there is provided a basic member or support and a heater for liquids which may be mounted on the basic member. The basic member is provided with a door which may be hinged thereto and has an opening positioned to be closed by the door when the latter is shut. Carried by the door is a reservoir and this reservoir is connected through the door to a burner which may be swung in and out of the basic member by closing and opening the door.

There is also provided a supplemental device consisting of an extended leg and a cover hinged together, the cover having a hole therethrough and provided with flanges for engaging the door and basic member, said cover when associated with the door and basic member providing a closure for the burner then outside of the basic member, and a support for cooking utensils with the burner underneath the opening in the top member of the supplemental device. By properly proportioning the parts the supplemental device may be stored within the basic member.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figure 1 is a perspective view of the heater with some parts broken away to show interior parts.

Fig. 2 is a top plan view of the burner and reservoir with the basic member in cross section.

Fig. 3 is a top plan view of the basic member, with the heater withdrawn therefrom and the supplemental device in operative position.

Fig. 4 is a side elevation of the parts shown in Fig. 3.

Fig. 5 is a perspective view of the supplemental device.

Referring to the drawing, there is shown a basic member 1 which may be of cylindrical form, although such particular form is not obligatory. The basic member is provided with a bottom portion 2 which may rest on any suitable support and with a side opening 3 of suitable size to permit the introduction into and withdrawal from the basic member of certain parts to be described. The top of the basic member may be open.

There is also provided a door 4 conforming to the exterior shape of the basic member and is connected to the basic member by hinges 5 so as to be swung toward and from the opening 3, the door being large enough to overlap the opening on all sides and the door rising to about the top of the basic member. That part of the door remote from the hinges is supplied with a latch 6 positioned to engage a keeper 7 on the basic member whereby the door may be securely held in the closed position.

Secured to the exterior of the door 4 by a strap 8 is a reservoir 9 which may be conveniently made in the form of a can with a filling opening at the top normally closed by a cap 10. Leading from the bottom of the reservoir, which may be rounded as shown at 11, is a pipe 12 extending through the door and supported thereby. At the end of the pipe 12 remote from the reservoir is a burner 13 which may be of any appropriate type and is preferably of a kind which will produce a hot smokeless flame from liquid fuel. The burner is so located with reference to the door that the latter may be swung on its hinges toward or from the basic member 1, thereby carrying the burner 13 into or out from the interior of the basic member, and, when in the latter, being substantially centralized with relation thereto.

Adapted to the basic member so as to be supported thereby is a heater 14, which, like the basic member, may be, although is not necessarily, of cylindrical shape. The heater, being intended to contain liquid, is provided with a bottom 15 and a top 16 and with longitudinal interior flues 17 all of which may communicate within the top 16 with a central collar 18 for the reception of a smoke pipe, or gases of combustion passing through the flues 17 may escape to the atmosphere directly through the collar 18. In order to introduce water or other liquid into the heater 14 a funnel 19 is provided, which funnel may be closed in any appropriate manner. In order to remove liquid from the heater 14 it is provided with a valve or spigot 20 near the bottom thereof.

The hinged door 4 supporting the burner and fuel reservoir connected to the burner provides a convenient means for heating liquid in the heater 14, the flues 17 serving to bring the hot gases of combustion into extended heating relation to the water or other liquid therein.

There is also provided a supplemental device comprising a plate 21 of a height about equal to the height of the basic member 1 and hinged to one end of the plate 21 is another plate 22, the hinge connection being shown at 23. The plate 22 has an opening 24 therethrough, which opening may be conveniently arranged about centrally of the plate. That edge of the plate 22 remote from the hinge 23 is curved in conformity with the curvature of the door at the top thereof and a similarly curved flange 25 projects from the curved edge of the plate 22 substantially perpendicular thereto. Between the curved edge of the plate 22 and the hinge 23 the plate is inversely curved, as shown at 26, and provided with a similarly curved flange 27 which may be continued to meet the flange 25. The two curved flanges are separated to engage the door and also engage the inner face of the basic member 1 when the door 4 is open. The two flanges being in generally right angular relation and the door 4 being hinged to the basic member 1 serve to lock the door and basic member together when the door is open, and the plate 22 is thereby supported along two edges, a third edge being upheld by the plate 21 serving as a leg. When the parts are in the position just described, the burner 13 is situated directly under the opening 24 so that the plate 22 constitutes the top of a heating stove with the burner protected in large part from the effects of wind or drafts by the then oppositely disposed door and leg 21 and the body of the basic member 1.

The arrangement is such that the heating structure, of which the supplementary device forms a considerable part, is firmly assembled and cooking may be performed on the heating device with safety.

When the supplemental device is not in use it may be folded up, because of the hinge 23, and stored in the basic member 1.

What is claimed is:—

1. A heating device, comprising a basic member with an opening at one side, a door hinged to the basic member in position to cover the opening when the door is closed, and a heating unit including a reservoir for fuel secured to the outer face of the door, a feed pipe leading from the reservoir and a burner carried by the feed pipe in spaced relation to the inner face of the door and movable into and out of the basic member through the opening therein on the closing and opening of the door.

2. In a heating device, a basic member, a support thereon movable with relation to the basic member, and a heating unit on the support comprising a reservoir for fuel and a burner connected to the reservoir and both the reservoir and burner being carried by the support, and said support being movable toward and from the basic member to move the burner into and out of the basic member in accordance with the movement of the support toward and from the basic member.

3. In a heating device, a basic member having an opening through one side, a door hinged to the basic member adjacent to the opening and movable into and out of covering relation to the opening, a fuel reservoir secured to the outer surface of the door, a feed pipe connected to the reservoir and extending through the door beyond the inner face thereof, and a burner carried by the fuel pipe and movable into and out of the basic member through the opening therethrough by the movement of the door to the closed and open positions.

4. A heating device comprising a basic member, a heating unit carried by the basic member, consisting of a reservoir for fuel exterior to the basic member, and a burner connected to the reservoir and movable into and out of the basic member, said burner and reservoir being in fixed relation and provided with a mounting carrying them, with the mounting movable to permit the movement of the burner into and out of the basic member.

5. A heating device, comprising a basic member, a heater for liquids adapted to rest on the basic member and having ducts therethrough for products of combustion, a heating unit consisting of a reservoir for fuel, a burner and a fuel pipe connecting the reservoir and burner, and a carrier for the heating unit comprising a swinging member on which the heating unit is mounted, with the burner related to the swinging member to be moved into and out of the basic member by movements of the swinging member.

6. In a heating device, a basic member, a movable member connected thereto, a burner carried by the movable member, and a removable device for holding said movable member in a rigid relation when moved away from the basic member, said device serving as a support for cooking utensils.

7. In a heating device, a basic member, a movable member connected thereto, a burner carried by the movable member, and a removable device consisting of two plates hinged together, one plate forming a supporting leg and the other plate being perforated, and adapted to rest upon the top of the movable member and serve as a cover for cooking utensils.

8. In a heating device, a basic member, a movable door connected thereto, a burner carried by the door, a supplemental device connecting the door and basic member and holding said parts in rigid relation when the door is open, said device serving as a support for cooking utensils, and combining with the door and basic member to form a closure for the burner.

9. In a heating device, a basic member, a swinging door for the basic member hinged thereto, a heating unit carried by the door and including a burner, and a supplemental device comprising a plate with a passage therethrough for the products of combustion from the burner, said plate having edge flanges for engaging the door and the body of the basic member, and a support on the plate on the side thereof remote from one of the edge flanges.

10. In a heating device, a basic member, a swinging door for the basic member hinged thereto, a heating unit carried by the door and including a burner, and a supplemental device comprising a plate with a passage therethrough for the products of combustion from the burner, said plate having edge flanges for engaging the door and the body of the basic member, and a support on the plate on the side thereof remote from one of the edge flanges, said support being hinged to the plate whereby the plate and support may be folded together for lodgment in the basic member.

11. In a heating device, a basic member with an opening through one side, a door hinged to the basic member for closing said opening, a heating unit carried by the door and provided with a burner on the inner face of the door, and a supplemental device comprising two plates hinged together, one plate having an opening therethrough and said plate having flanges for engaging the door and the basic member, with the flanges meeting and one flange being on the opposite side of the plate from the other plate, the other flange extending between the first flange and the other plate.

12. In a heating device, a basic member with an opening through one side, a door hinged to the basic member for closing said opening, a heating unit carried by the door and provided with a burner on the inner face of the door, and a supplemental device comprising two plates hinged together, one plate having an opening therethrough and said plate having flanges for engaging the door and the basic member, with the flanges meeting and one flange being on the opposite side of the plate from the other plate, the other flange extending between the first flange and the other plate, and the basic member being of cylindrical conformation, and the flanges on the plate with the passage therethrough and also the corresponding edges of the plate being curved in conformity with the curvature of the door and the inner wall of the basic member.

In testimony that I claim the foregoing as my own, I have hereto affixed my signature.

WILLIAM ANDREW BREWSTER.